United States Patent [19]

Kato et al.

[11] Patent Number: 4,859,750

[45] Date of Patent: * Aug. 22, 1989

[54] METHOD FOR THE PRODUCTION OF POLYMETHYL METHACRYLATE

[75] Inventors: Yasuyuki Kato; Masahiro Yuyama; Masahiko Moritani, all of Ehime; Yukio Yasunori, Osaka, all of Japan

[73] Assignee: Sumitomo Chemical Company, Limited, Osaka, Japan

[ * ] Notice: The portion of the term of this patent subsequent to Jan. 5, 2005 has been disclaimed.

[21] Appl. No.: 898,514

[22] Filed: Aug. 21, 1986

[30] Foreign Application Priority Data

Aug. 21, 1985 [JP] Japan ................................ 60-183423

[51] Int. Cl.$^4$ ...................... C08F 11/06; C08F 120/18
[52] U.S. Cl. .................................... 526/135; 526/146; 526/147; 526/329.7
[58] Field of Search ...................... 526/329.7, 217, 146, 526/147, 135

[56] References Cited

U.S. PATENT DOCUMENTS

| | | | |
|---|---|---|---|
| 2,946,770 | 7/1960 | Bäder et al. | 526/91 |
| 3,364,182 | 1/1968 | Griffith | 526/329.7 |
| 3,565,822 | 2/1971 | Bodycot | 562/160 |
| 3,739,043 | 6/1973 | Fryd et al. | 526/329.7 |
| 3,803,265 | 4/1974 | Griffith et al. | 526/329.7 |
| 3,950,314 | 4/1976 | Graff | 526/329.7 |
| 4,174,311 | 11/1979 | Nakano et al. | 524/854 |
| 4,214,064 | 7/1980 | Kanagawa | 526/329.7 |
| 4,259,462 | 3/1981 | Nakano et al. | 525/263 |
| 4,467,079 | 8/1984 | Hechenberger et al. | 526/217 |

FOREIGN PATENT DOCUMENTS 1146254 3/1963 Fed. Rep. of Germany .

*Primary Examiner*—Joseph L. Schofer
*Assistant Examiner*—Peter F. Kulkosky
*Attorney, Agent, or Firm*—Birch, Stewart, Kolasch & Birch

[57] ABSTRACT

Improved method for the production of a polymer of a monofunctional (unsaturated) monomer, particularly polymethyl methacrylate, by a rapid crosslinking polymerization, which comprises polymerizing a mixture of a monofunctional (unsaturated) monomers, selected from methyl methacrylate and a monomer mixture comprising predominantly methyl methacrylate which may partially contain a polymer of the monomer (i.e. a syrup of the monomer or monomer mixture), and a polyfunctional (unsaturated) monomer in the presence of (1) a radical polymerization initiator, (2) a reducing compound containing sulfur in the molecule thereof, (3) an amine hydrohalogenate or a quaternary ammonium halide and (4) a copper-containing compound. Said polymer has high mechanical properties and excellent transparency and is useful particularly for the production of optical parts such as conventional lenses, Fresnel's lens, optical recording disc media, prisms, mirrors, etc.

8 Claims, No Drawings

METHOD FOR THE PRODUCTION OF POLYMETHYL METHACRYLATE

This invention relates to an improved method for the production of a polymer of an unsaturated monomer comprising predominantly methyl methacrylate. More particularly, it relates to a method for the production of a polymer of an unsaturated monomer comprising predominately methyl methacrylate (e.g. polymethyl methacrylate) having high mechanical properties and excellent transparency by rapid crosslinking polymerization, which comprises polymerizing a mixture of a monofunctional (unsaturated) monomer, selected from methyl methacrylate and a monomer mixture comprising predominantly methyl methacrylate which may partly contain a polymer of the monomer, and a polyfunctional (unsaturated) monomer in the presence of a specific polymerization initiator and polymerization accelerator.

PRIOR ART

It is disclosed in West German patent publication No. 1,146,254 that an unsaturated monomer such as methyl methacrylate is polymerized in the presence of an alkylacyl peroxide, a compound containing sulfur in the molecule, a halogen-containing compound (e.g. tertiary amine hydrochloride, etc.) and a heavy metal-containing compound at room temperature.

It is also disclosed in Japanese patent first publication No. 16786/1984 that a methacrylic acid ester is rapidly polymerized in the presence of a catalyst consisting of an organic hydroperoxide and methyl sulfite chloride, which may optionally contain an organic acid and magnesium oxide, etc.

According to the polymerization method of methyl methacrylate by the above West German patent publication, when the polymerization is carried out within a short period of time such as 10 minutes, the produced polymer has a low molecular weight and hence has a very low mechanical property. Besides, according to the method of the above Japanese patent publication, the catalyst such as methyl sulfite chloride used therein is very unstable and is easily deactivated by moisture in the air, and hence, it is troublesome in handling thereof. Moreover, the inorganic compound such as magnesium oxide is insoluble in the resulting polymethyl methacrylate, and hence, the product thus produced has less transparency.

SUMMARY OF THE INVENTION

The present inventors have studied an improved method for the production of polymethyl methacrylate having excellent mechanical properties and transparency by rapid polymerization and have found that the desired polymer can be prepared by polymerizing a monofunctional (unsaturated) monomer, selected from methyl methacrylate and a monomer mixture comprising predominantly methyl methacrylate, together with a polyfunctional (unsaturated) monomer having two or more functional groups copolymerizable with methyl methacrylate in the presence of specific polymerization initiator and polymerization accelerator.

An object of the invention is to provide an improved method for the production of a polymer of an unsaturated monomer comprising predominantly methyl methacrylate, particularly polymethyl methacrylate, having high mechanical properties and excellent transparency. Another object of the invention is to provide a rapid polymerization method for the production of polymethyl methacrylate having the desired properties. These and other objects and advantages of the invention will be apparent to skilled persons from the following description.

DETAILED DESCRIPTION OF THE INVENTION

The present invention provides a method for the production of a polymer of a monofunctional (unsaturated) monomer which comprises polymerizing a mixture of 100 parts by weight of a monofunctional (unsaturated) monomer, selected from methyl methacrylate and a monomer mixture comprising predominantly methyl methacrylate which may partially contain a polymer of the monomer, and 0.5 to 25 parts by weight of a polyfunctional (unsaturated) monomer in the presence of (1) a radical polymerization initiator, (2) a reducing compound containing sulfur in the molecule thereof, (3) an amine hydrohalogenate or a quaternary ammonium halide and (4) a copper-containing compound.

In this invention, methyl methacrylate may be used alone, but other copolymerizable mono-functional (unsaturated monomers may optionally be used together in order to improve the polymerization activity in the polymerization step or improve the properties of the polymer. Suitable examples of the copolymerizable monomer are, for example, acrylic or methacrylic acid esters of straight chain aliphatic, alicyclic or aromatic alcohols having 1 to 25 carbon atoms, such as methyl acrylate, ethyl acrylate, ethyl methacrylate, isobutyl acrylate, isobutyl methacrylate, isopropyl acrylate, isopropyl methacrylate, t-butyl acrylate, t-butyl methacrylate, phenyl acrylate, phenyl methacrylate, cyclohexyl acrylate, cyclohexyl methacrylate, etc.; aromatic vinyl compounds, such as styrene, p-methylstyrene, α-methylstyrene, etc.; acrylic acid; methacrylic acid; maleic anhydride; acrylonitrile; and the like. These copolymerizable monomers may be used in an amount of not more than 50% by weight, preferably not more than 30% by weight. When the copolymerizable monomer is used in an amount of over 50% by weight, the original properties of polymethyl methacrylate, such as gloss, weatherability, heat resistance, hardness, etc. are undesirably deteriorated.

Methyl methacrylate or the monomer mixture comprising predominantly methyl methacrylate may be used in the form of a pure monomer, but preferably it is used in the form of so-called syrup of the monomer which contain partially a polymer of the monomer in order to improve the polymerization activity or in view of easy handling thereof. The syrup is usually prepared by dissolving 1 to 40% by weight of polymethyl methacrylate in methyl methacrylate or a monomer mixture comprising predominantly methyl methacrylate, or by polymerizing partly methyl methacrylate or a monomer mixture comprising predominantly methyl methacrylate in the presence of a radical polymerization initiator.

This invention is particularly characteristic in that the monomer or monomer mixture is copolymerized with a polyfunctional (unsaturated) monomer containing two or more functional groups copolymerizable with methyl methacrylate. The polyfunctional monomer is used in order to improve the mechanical properties of the polymer and also to accelerate the polymerization rate. When the polyfunctional (unsaturated) monomer is used in a conventional slow rate polymerization reaction, it causes production a partial gel within the polymer which induces an undesirably non-uniform polymer product, but when it is used in the rapid polymerization reaction as in this invention, there can be produced the desirable uniform polymer product without production of such a gel.

Suitable examples of the polyfunctional (unsaturated) monomer containing two or more functional groups copolymerizable with methyl methacrylate are ethylene glycol or oligomers thereof, both terminal hydroxy groups of which are esterified with acrylic acid or methacrylic acid, such as ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, nonaethylene glycol diacrylate, nonaethylene glycol dimethacrylate, tetradecaethylene glycol diacrylate, tetradecaethylene glycol dimethacrylate, etc.; dihydric alcohols, hydroxy groups of which are esterified with acrylic acid or methacrylic acid, such as neopentyl glycol diacrylate, neopentyl glycol dimethacrylate, hexanediol diacrylate, hexanediol dimethacrylate, butanediol diacrylate, butanediol dimethacrylate, etc.; bisphenol A or bisphenol A alkeneoxide adducts, the terminal hydroxy group of which is esterified with acrylic acid or methacrylic acid; acrylic or methacrylic acid esters of polyhydric alcohols (e.g. trimethylolpropane, pentaerythritol, etc.); glycidyl acrylate or glycidyl methacrylate adducts of the dihydric or polyhydric alcohols as mentioned above which are prepared by adding glycidyl acrylate or glycidyl methacrylate to the terminal hydroxy groups of the alcohols by an epoxy group-ring opening reaction; glycidyl acrylate or glycidyl methacrylate adducts of dibasic acids (e.g. succinic acid, adipic acid, terephthalic acid, phthalic acid, etc.), which are prepared by adding glycidyl acrylate or glycidyl methacrylate to the dibasic acids by an epoxy group-ring opening reaction; aryl methacrylates; divinyl benzene; and the like. The polyfunctional (unsaturated) monomer is used in an amount of 0.5 to 25 parts by weight, preferably 1 to 10 parts by weight, per 100 parts by weight of the monofunctional (unsaturated) monomer selected from methyl methacrylate, a monomer mixture comprising predominantly methyl methacrylate and a syrup of the monomers. When the polyfunctional monomer is used in an amount of less than 0.5 part by weight, the improvement of mechanical properties of the polymer cannot sufficiently be achieved and the polymerization can little or not be accelerated, either. On the other hand, when the amount is over 25 parts by weight, the resulting polymer shows undesirably inferior mechanical properties.

The radical polymerization initiator is preferably peroxides, particularly peroxyesters and hydroperoxides, in view of high polymerization activity. Suitable examples of the peroxyesters are, for example, t-butyl peroxy-3,5,5-trimethylhexanoate, t-butyl peroxybenzoate, and the like. Suitable examples of the hydroperoxides are t-butyl hydroperoxide, cumene hydroperoxide, diisopropylbenzene hydroperoxide, p-menthane hydroperoxide, 2,5-dimethylhexane-2,5-dihydroperoxide, 1,1,3,3-tetramethylbutyl hydroperoxide, and the like. The initiator is used in an amount of 0.1 to 5 parts by weight per 100 parts by weight of the monofunctional (unsaturated) monomer or a syrup thereof. When the amount of the initiator is less than 0.1 part by weight, the polymerization does not sufficiently proceed, by which the produced polymer contains unfavorably a large amount of the unreacted monomers. On the other hand, when the amount of the initiator is over 5 parts by weight, it is difficult to control the polymerization reaction, and hence, the resulting polymer shows unfavorably lower weatherability and heat resistance.

The reducing compound containing sulfur in the molecule thereof used in this invention is a compound which forms a Redox system with the radical polymerization initiator, and includes divalent or tetravalent sulfur compounds selected from sulfinic acid esters, thioureas and mercaptans. Suitable examples of the sulfur-containing reducing compound are methyl p-toluenesulfinate, ethyl p-toluenesulfinate, tetramethylthiourea, dibutylthiourea, laurylmercaptan, t-dodecylmercaptan, octylmercaptan, butylmercaptan, 2-ethylhexyl thioglycolate, glycol dimercaptoacetate, 2-mercaptoethanol and esters thereof, β-mercaptopropionic acid and esters thereof, and the like. The sulfur-containing reducing compound is used in an amount of 0.1 to 5 parts by weight per 100 parts by weight of the monofunctional (unsaturated) monomer or a syrup thereof. When the amount of the sulfur-containing reducing compound is less than 0.1 part by weight, the polymerization reaction proceeds at a slower rate, and on the other hand, when it is more than 5 parts by weight, the resulting polymer is unfavorably colored and shows less mechanical properties.

The amine hydrohalogenate or quaternary ammonium halide used in this invention includes, for example, hydrochloride or hydrobromide of an amine such as n-amylamine, n-hexylamine, n-octylamine, n-decylamine, laurylamine, palmitylamine, dibutylamine, tributylamine, N,N-dimethylbenzylamine, N,N-dimethyl-p-toluidine, phenethyldibutylamine, N,N,N',N'-tetramethylhexamethylenediamine, N,N,N'N'-tetramethylpropylenediamine, N,N-diethylbenzylamine, N,N-dibutylbenzylamine, phenethyldiethylamine, etc.; quaternary ammonium halides, such as tetramethylammonium chloride, benzyltrimethylammonium chloride, benzyltriethylammonium chloride, benzyltributylammonium chloride, trioctylmethylammonium chloride, β-phenethyldibutylethoxycarbonylmethylammonium chloride, and the like. These compounds are used in an amount of 0.005 to 1 part by weight, preferably 0.01 to 0.5 part by weight, per 100 parts by weight of the monofunctional (unsaturated) monomer or syrup thereof. When the amount of the above compounds is less than 0.005 part by weight or more than 1 part by weight, the polymerization reaction proceeds unfavorably at a slower rate. When the above compounds are soluble in the monofunctional (unsaturated) monomer or syrup thereof, they may be used as they stand, but when they are insoluble in the monomer or syrup thereof, they are usually used in the form of a solution thereof in a suitable solvent, such as isopropanol, dimethyl phthalate, diethylene glycol, and the like.

The copper-containing compound used in this invention functions as a catalyst for decomposing the polymerization initiator, and includes copper salts of organic acids and copper-containing complexes, for example, copper naphthenate, copper acetylacetonate, and the like. These copper-containing compounds are used in an amount of 0.005 to 10 ppm (calculated in copper weight), preferably 0.1 to 5 ppm, based on the weight of the monofunctional (unsaturated) monomer or syrup thereof. When the amount of the compound is less than 0.005 ppm, the polymerization reaction proceeds in slower rate and the polymerization time of period is not fixed. On the other hand, when the amount of the compound is over 10 ppm, the polymerization initiator is unfavorably deactivated and hence the polymerization reaction is inhibited.

The polymerization reaction of this invention is carried out by a bulk polymerization method where a mould is used. A liquid composition is prepared by dissolving a polyfunctional (unsaturated) monomer, a radical polymerization initiator, a sulfur-containing reducing compound, an amine hydrohalogenate or quaternary ammonium halide, and a copper-containing compound in methyl methacrylate, a monomer mixture comprising predominantly methyl methacrylate, or a syrup thereof, and the liquid composition thus prepared is poured into the mould, and subjected to the polymerization reaction. Some of the polyfunctional (unsaturated) monomers can partially be polymerized by adding previously added to methyl methacrylate or the monomer mixture, and hence, such polyfunctional monomer may be added in the step of the preparation of the monomer syrup.

In the above polymerization within a mould, each component such as the polymerization initiator may individually be added to the monomer, but owing to the high reactivity, it is sometimes very difficult to mix them uniformly. Accordingly, in the preferred embodiment, the monomer or syrup is divided into two parts, and the polymerization initiator and amine hydrohalogenate or quaternary ammonium halide are added to one part, and the sulfur-containing reducing compound and the copper-containing compound are added to the other part. These two parts are respectively dissolved and then mixed immediately before being subjected to the polymerization reaction.

The method of this invention may be carried out at room temperature, but is preferably carried out at an elevated temperature such as 50° C. or higher in order to accelerate the polymerization. In such a case, the monomer, polymerization initiator and other ingredients may be mixed and then poured into the mould. The temperature in the mould is raised to 50° C. or higher, and then the monomer, polymerization initiator and other ingredients are then mixed and poured into the mould, followed by subjecting the mixture to polymerization.

The method of this invention can be applied to the production of various formed products of polymethyl methacrylate. That is, by varying the shape of the mould which is used in the polymerization, there can be obtained various shaped products.

This method is particularly suitable for the production of optical parts because the polymer thus prepared has extremely less internal strain. Such optical parts include conventional lenses, Fresnel's lens, optical recording disc media, prisms, mirrors, and the like. In this method, the face of the mould can be precisely transferred to the shaped products, and hence, it is particularly suitable for the production of Fresnel's lens which requires precise shape. Moreover, this method can easily give a large scale shaped product, and hence, is suitable for the production of automobile parts such as a front window, sun roof, side window, rear window, etc., and further water tank panels, bathtubs, and the like.

According to this invention, there can be produced the desired polymer, having excellent transparency and mechanical properties, in a very short period of poylmerization such as within 10 minutes, particularly within 5 minutes. Nevertheless with the very short polymerization time, the formed products of polymethyl methacrylate of this invention have excellent mechanical properties.

This invention is illustrated by the following Examples, but should not be construed to be limited thereto. In Examples, the flexural strength was measured by the method as described in ASTM D-790 and the haze was measured by the method as described in ASTM D-1003.

EXAMPLES 1 TO 11 AND REFERENCE EXAMPLES 1 TO 3

Preparation of starting syrup of methyl methacrylate:

A 10 liter stainless sealed vessel is charged with methyl methacrylate (4 kg) and polymethyl methacrylate (SUMIPEX®-B LG-6, manufactured by Sumitomo Chemical Co., Ltd., 1 kg), and the mixture is dissolved at 60° C. for 4 hours to give the desired starting syrup having a polymer content of 20% by weight and a viscosity of 0.5 pois.

Preparation of Syrup A:

In the starting syrup of methyl methacrylate (50 g) are dissolved a prescribed amount of a polyfunctional (unsaturated) monomer as shown in Table 1, glycol dimercaptoacetate (0.4 g), and a 1% solution (0.04 g) of copper naphthenate (Cu content: 10% by weight) in methyl methacrylate to give Syrup A.

Preparation of Syrup B:

In the starting syrup of methyl methacrylate (50 g) are dissolved t-butyl peroxybenzoate (0.96 g) and a 8% solutions (0.96 g) of phenethyldibutylamine hydrochloride in dimethyl phthalate to give Syrup B.

Polymerization:

Syrup A and Syrup B are mixed and the mixture is immediately poured into a mould (150×150×3 mm), and then subjected to polymerization by dipping into a water bath of 85° C. The time of almost completion of the polymerization reaction (the time of raising to the peak due to the reaction heat) and the strength and haze of the resulting polymer are shown in Table 1.

TABLE 1

| Ex. No. | Polyfunctional (saturated) monomer | | Peak time (min.) | Flexural strength (kg/cm²) | Haze |
|---|---|---|---|---|---|
| | Kind | Amount (wt. %) | | | |
| Ex. 1 | 1G | 1 | 3.5 | 900 | 0.3 |
| Ex. 2 | " | 5 | 3.0 | 1100 | 0.6 |
| Ex. 3 | " | 3 | 3.0 | 950 | 0.2 |
| Ex. 4 | 4G | 5 | 2.4 | 900 | 0.9 |
| Ex. 5 | " | 10 | 2.4 | 820 | 1.0 |
| Ex. 6 | 14G | 10 | 2.5 | 1100 | 0.9 |
| Ex. 7 | PDA-200 | 5 | 5.0 | 1050 | 0.3 |
| Ex. 8 | ADA-400 | 5 | 3.0 | 900 | 0.4 |
| Ex. 9 | NPG | 5 | 3.0 | 1000 | 0.3 |
| Ex. 10 | TMPT | 5 | 2.4 | 700 | 2.0 |
| Ex. 11 | HD | 5 | 2.7 | 950 | 0.5 |
| Ref. Ex. 1 | 4G | 30 | 2.0 | 150 | 25 |
| Ref. Ex. 2 | " | 0.3 | 5.0 | 200 | 0.3 |

[Remarks]: The kinds of the polyfunctional (unsaturated) monomers are as follows:
1G: Ethylene glycol dimethacrylate
4G: Tetraethylene glycol dimethacrylate
14G: Tetradecaethylene glycol dimethacrylate

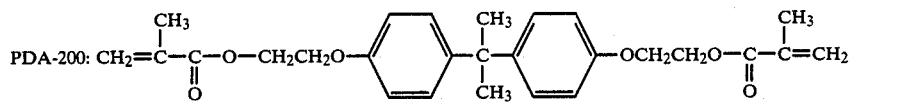

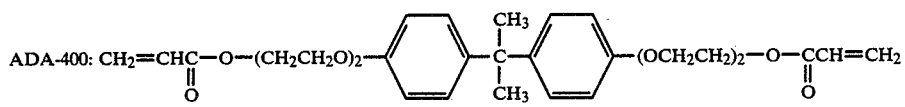

NPG: Neopentyl glycol dimethacrylate
TMPT: Trimethylolpropane trimethacrylate
HD: Hexanediol dimethacrylate

EXAMPLES 12 TO 13 AND REFERENCE EXAMPLE 3

| Components | Amount |
| --- | --- |
| Starting syrup of methyl methacrylate as used in Example 1 | 100 g |
| t-Dodecylmercaptan | 1 g |
| Copper naphthenate (Cu content: 10%) | 0.001 g |
| t-Butyl peroxybenzoate | 0.7 g |
| Dibutylamine hydrochloride (10% solution in diethylene glycol) | 0.6 g |
| 14G | Prescribed amount (cf. Table 2) |

The above components are mixed at room temperature for one minute, and the mixture is poured into a mould (150×150×3 mm) and subjected to polymerization reaction by dipping in a water bath of 65° C. to prepare the polymer. The results are shown in Table 2.

TABLE 2

| Ex. No. | Amount of 14G (wt. %) | Peak time (minute) | Flexural strength (kg/cm$^2$) | Haze |
| --- | --- | --- | --- | --- |
| Ex. 12 | 12 | 7.0 | 1100 | 0.9 |
| Ex. 13 | 18 | 6.8 | 900 | 1.0 |
| Ref. Ex. 3 | 30 | 5.0 | 250 | 13.0 |

EXAMPLE 14

Preparation of Syrup C:
According to the following formulation, Syrup C is prepared in the same manner as described in Example 1.

| Components | Amount |
| --- | --- |
| Starting syrup of methyl methacrylate as used in Example 1 | 50 g |
| 14G | 10 g |
| Glycol dimercaptoacetate | 0.6 g |
| Copper naphthenate (Cu content: 10%) | 0.0004 g |

Preparation of Syrup D:
According to the following formulation, Syrup D is prepared likewise.

| Components | Amount |
| --- | --- |
| Starting syrup of methyl methacrylate as used in Example 1 | 50 g |
| Dibutyl peroxyazelate | 1 g |
| Phenethyldibutylamine hydrochloride (8% solution in dimethyl phthalate) | 0.8 g |

Syrup C and Syrup D are mixed and the mixture is immediately poured into a mould (150×150×3 mm) and polymerized at 90° C. The polymerization is completed in 4 minutes, and the resulting polymer has the flexural strength of 1,200 kg/cm$^2$ and the haze of 0.8. The polymer shows excellent mechanical properties and appearance.

EXAMPLE 15

Preparation of Syrup E:
According to the following formulation, Syrup E is prepared in the same manner as described in Example 1.

| Components | Amount |
| --- | --- |
| Starting syrup of methyl methacrylate as used in Example 1 | 50 g |
| 14G | 10 g |
| Glycol dimercaptoacetate | 0.6 g |
| Copper naphthenate (Cu content: 10%) | 0.0004 g |

Preparation of Syrup F:
According to the following formulation, Syrup F is prepared likewise.

| Components | Amount |
| --- | --- |
| Starting syrup of methyl methacrylate as used in Example 1 | 50 g |
| Cumene hydroperoxide | 0.9 g |
| Phenethyldibutylamine hydrochloride (8% solution in dimethyl phthalate) | 0.9 g |

Syrup E and Syrup F are mixed and the mixture is immediately poured into a mould (150×150×3 mm) and polymerized at 80° C. The polymerization is completed in 8 minutes, and the resulting polymer has the flexural strength of 1,000 kg/cm$^2$ and the haze of 0.9. The polymer shows excellent mechanical properties and appearance.

What is claimed is:
1. A method for the production of a polymer having improved flexural strength and transparency which comprises polymerizing a mixture of 100 parts by weight of a monofunctional unsaturated monomer or methyl methacrylate and a monomer mixture comprising predominantly methyl methacrylate which may partially contain a polymer of said monomer and 0.5 to

25 parts by weight of a polyfunctional unsaturated monomer selected from the group consisting of an acrylic acid or methacrylic acid ester of ethylene glycol and oligomers thereof, an acrylic acid or methacrylic acid ester of dihydric alcohols, an acrylic acid or methacrylic acid ester of bisphenol A or bisphenol A alkeneoxide adducts, glycidyl acrylate or glycidyl methacrylate adducts of dihydric or polyhydric alcohols, and glycidyl acrylate or glycidyl methacrylate adducts of dibasic acids in the presence of (1) a radical polymerization initiator of from 0.1 to 5 parts by weight per 100 parts by weight of said monofunctional unsaturated monomer, (2) a reducing compound containing sulfur in the molecule thereof of from 0.1 to 5 parts by weight per 100 parts by weight of said monofunctional unsaturated monomer, (3) an amine hydrohalogenate or a quaternary ammonium halide of from 0.005 to 1 parts by weight based on 100 parts by weight of said monofunctional unsaturated monomer and (4) a copper-containing compound in an amount of from 0.005 to 10 parts per million based upon the weight of the monofunctional unsaturated monomers, said polymerization being carried out by bulk polymerization with a mold.

2. A method according to claim 1, wherein the monofunctional unsaturated monomer is a syrup of methyl methacrylate or a monomer mixture comprising predominantly methyl methacrylate.

3. A method according to claim 1, wherein the polyfunctional unsaturated monomer is used in an amount of 1 to 10 parts by weight per 100 parts by weight of the monofunctional unsaturated monomer.

4. A method according to claim 1, wherein the radical polymerization initiator is a member selected from the group consisting of peroxyesters and hydroperoxides.

5. A method according to claim 1, wherein the sulfur-containing reducing compound is a member selected from the group consisting of sulfinic acid esters, thioureas and mercaptans.

6. A method according to claim 1, wherein the amine hydrohalogenate or quaternary ammonium halide is used in an amount of 0.01 to 0.5 part by weight per 100 parts by weight of the monofunctional unsaturated monomer.

7. A method according to claim 1, wherein said radical polymerization initiator is a peroxide.

8. A method according to claim 1, wherein said copper compound is selected from the group consisting of copper salts of organic acids and copper-containing complexes.

* * * * *